United States Patent [19]
Patterson

[11] Patent Number: 5,830,598
[45] Date of Patent: Nov. 3, 1998

[54] BATTERY PACK INCORPORATING BATTERY PACK CONTACT ASSEMBLY AND METHOD

[75] Inventor: Gregory S. Patterson, Morrisville, N.C.

[73] Assignee: Ericsson Inc., Research Triangle Park, N.C.

[21] Appl. No.: 702,138

[22] Filed: Aug. 15, 1996

[51] Int. Cl.[6] ...................................................... H01M 2/30
[52] U.S. Cl. ........................ 429/121; 429/158; 29/623.4; 439/886
[58] Field of Search .................................. 429/158, 159, 429/121; 29/623.4; 439/886

[56] References Cited

U.S. PATENT DOCUMENTS

| | | | |
|---|---|---|---|
| 3,783,030 | 1/1974 | Tietze | 429/158 X |
| 3,810,790 | 5/1974 | Denis . | |
| 3,992,227 | 11/1976 | Persson | 429/121 |
| 4,290,665 | 9/1981 | Krasnov et al. | 439/886 |
| 5,169,733 | 12/1992 | Savovic | 429/159 X |
| 5,302,110 | 4/1994 | Desai et al. | 429/159 X |
| 5,316,507 | 5/1994 | Capp | 439/886 |

FOREIGN PATENT DOCUMENTS

0607675 A1  7/1994  European Pat. Off. .

OTHER PUBLICATIONS

Patent Abstracts of Japan, vol. 11, No. 88, E–490, abstract of JP,A, 61–240570 (Fuji Electrochem Co Ltd), 25 Oct. 1986.

Patent Abstracts of Japan, vol. 15, No. 9, E–1021, abstract of JP,A,2–262240 (Matsushita Electric Ind Co Ltd), 25 Oct. 1990.

*Primary Examiner*—Stephen Kalafut
*Attorney, Agent, or Firm*—Nixon & Vanderhye PC

[57] ABSTRACT

A battery pack utilizes a battery pack contact assembly to ensure a good connection between the battery pack and the device being powered by the battery pack. The contact assembly includes a carrier, a first contact integral with the carrier, and a second contact integral with the carrier stamped from a conducting weldable material. A score line is provided between the carrier and the contacts. A selected portion of the contacts is plated with gold, defining an exposed weldable surface and a selectively plated surface. During assembly, the exposed weldable surface is welded to positive and negative terminal poles of the battery pack, and the carrier is fatigued along the score lines and removed. The resulting contacts are securely attached to the terminal poles of the battery pack and provide a gold-plated surface for contact with the battery pack powered device.

20 Claims, 3 Drawing Sheets

BATTERY PACK INCORPORATING BATTERY PACK CONTACT ASSEMBLY AND METHOD

BACKGROUND

The present invention relates generally to a power supply for a mobile communications device or the like and, more particularly, to a battery pack utilizing a battery pack contact assembly including a carrier supporting selectively plated contacts and a method of manufacturing a battery pack.

A power supply such as a battery pack typically accounts for a substantial portion of a portable communications device's physical volume. Minimizing this physical volume is an important advancement in mobile communications development. Typically, gold-plated contact points are used to provide good electrical contact between the battery pack and the portable transceiver. In the past, a typical battery pack would comprise a plurality of cells grouped as shown in FIG. 1. Interconnection among the cells is achieved by means of welded nickel straps. The battery pack itself carries two torsional springs having gold-plated tips for interconnecting the pack to the transceiver. With this approach, the presence of the springs and the straps within the battery pack contribute unnecessary physical bulk and manufacturing cost.

As an alternative to this design, the springs may be moved from the battery pack to the body of the communications device. With this approach, the springs contact the exposed terminal poles of two of the battery pack's cells as shown in FIG. 2. To ensure good contact, the poles of the cells are provided with gold plating. Because only two of the cells need plating, however, three kinds of cells are then required to be manufactured. That is, cells without gold plating, cells with gold-plated negative poles, and cells will gold-plated positive poles all must be provided.

Because of this requirement for three types of cells, the assembly of these cells into a battery pack incurs unneeded inventory control and article manipulation problems. Moreover, because of the realities of the manufacture of the cells, three cell assembly lines must be established to make the three types of cells, because the plating of the cell poles must be done early in the cell manufacturing process.

SUMMARY OF THE INVENTION

It is therefore an object of the invention to provide a battery pack and method that overcomes the drawbacks of the conventional battery pack arrangements. In this regard, it is an object of the invention to reduce the battery pack size and to set forth an innovative manufacturing process for efficiently producing battery packs.

These and other objects of the invention are achieved by providing a battery pack contact assembly that includes a carrier formed of a conducting weldable material and a first contact integral with the carrier having an exposed weldable surface and a selectively plated surface. A second contact may be provided integral with the carrier also including an exposed weldable surface and a selectively plated surface. Score lines are preferably provided between the carrier and the first and second contacts, respectively. In a preferred arrangement, the conducting weldable material includes nickel, and the selectively plated surfaces are plated with gold.

The carrier itself may be substantially U-shaped, wherein the first and second contacts extend from ends of the U-shape. In this regard, the first and second contacts preferably extend toward each other from the ends of the U-shape, and the selectively plated surfaces are disposed at innermost ends of the first and second contacts. Alternatively, the carrier and the contact may be substantially L-shaped, wherein the carrier forms a first leg of the L-shape and the contact forms a second leg of the L-shape. In this regard, the selectively plated surface is disposed at a distal end of the second leg and is substantially parallel with the first leg. In yet another alternative arrangement, the carrier and the contact are substantially T-shaped wherein the carrier forms a base of the T-shape and the contact forms a cross member of the T-shape. In this regard, the selectively plated surface is disposed substantially perpendicular to the base across an outmost section of the cross member. In still another alternative arrangement, the exposed weldable surface and the selectively plated surface are bent at substantially a 90° angle.

The exposed weldable surface is preferably adapted to be welded to a contact pole of a battery cell, and the selectively plated surface is preferably adapted to contact leads of a device powered by the battery pack.

In accordance with another aspect of the invention, there is provided a battery pack including a plurality of battery cells disposed adjacent one another and connected in series. The plurality of cells includes a positive terminal pole and a negative terminal pole adapted to contact leads of the device powered by the battery pack. The battery pack also includes a positive contact and a negative contact each having an exposed weldable surface and a selectively plated surface. The exposed weldable surfaces are welded to the positive terminal pole and the negative terminal pole, respectively, and the selectively plated surfaces are adapted to contact leads of the device powered by the battery pack. The positive contact and the negative contact may be formed of nickel-plated copper and the selectively plated surfaces may be plated with gold. In one arrangement, the battery pack includes N battery cells where N is at least 4. In this regard, the battery cells are aligned in a pattern such that a negative pole of one battery cell is disposed adjacent and electrically connected to a positive pole of an adjacent battery cell. Either the positive pole or the negative pole of the (N−1)th cell includes the corresponding positive terminal pole or negative terminal pole, and the other of the positive pole or the negative pole of the Nth cell includes the corresponding other of the positive terminal pole and the negative terminal pole. Either the negative pole or the positive pole of the Nth cell is electrically connected to either the positive pole or the negative pole of the first battery cell, respectively.

In accordance with yet another aspect of the invention, there is provided a method of manufacturing the battery pack according to the invention. The method includes (a) stamping a battery pack contact assembly from a metal sheet, the battery pack contact assembly including the positive contact and the negative contact integral with a carrier, (b) selectively plating the positive contact and the negative contact to define a selectively plated surface and an exposed weldable surface, (c) welding the exposed weldable surfaces of the positive contact and the negative contact to the positive terminal pole and the negative terminal pole, respectively, and (d) separating the carrier from the contacts. Step (a) preferably includes forming a score line between the carrier and the contacts. In this regard, step (d) may be practiced by fatiguing the carrier along the score line. Step (b) may be practiced by selectively plating the contacts with gold.

BRIEF DESCRIPTION OF THE DRAWINGS

These and others aspects and advantages of the present invention will be described in detail with reference to the accompanying drawings, in which.

DETAILED DESCRIPTION OF PREFERRED EMBODIMENTS

Figure 3:
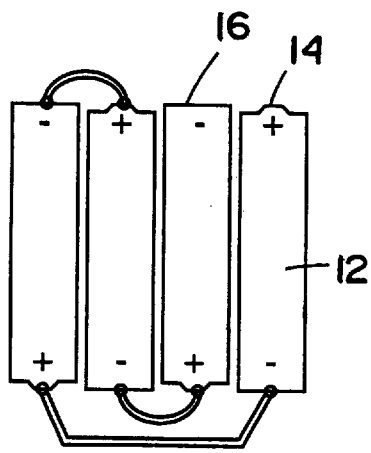
FIG. 3 illustrates a battery pack according to the present invention.

FIG. 3 shows the arrangement of battery cells within the battery pack according to the present invention. The battery pack is shown with four battery cells for example purposes only. Those of ordinary skill in the art will understand that different numbers of battery cells would be suitable for the features of the present invention, and the invention is not meant to be limited to four battery cells.

The battery cells 12 are disposed adjacent one another and connected in series defining a positive terminal pole 14 and a negative terminal pole 16. The positive and negative terminal poles 14, 16 are adapted to contact leads of a device powered by the battery pack, such as a mobile communications device (not shown).

As shown in FIG. 3, the battery cells are aligned in a pattern such that a negative pole of one battery cell is disposed adjacent and electrically connected to a positive pole of an adjacent battery cell, with the exception of the positive and negative terminal poles 14, 16.

Figure 4:
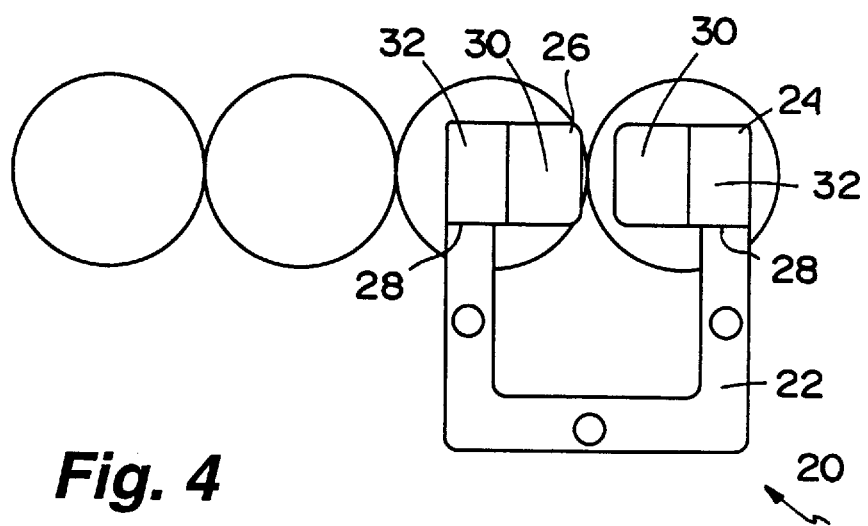
FIG. 4 is a plan view of the battery pack shown in FIG. 3 before the carrier of the contact assembly is removed.

In order to assure good contact between the terminal poles 14, 16 and the contact leads of the battery pack powered device, it is desirable to utilize gold or gold-plated contacts. In the past, however, it has been difficult to secure gold or gold plated contacts to the terminal poles 14, 16 for contact with the device leads. In accordance with the present invention referring to FIG. 4, a battery pack contact assembly 20 is utilized to secure selectively plated contacts to the terminal poles 14, 16 of the battery train. The contact assembly 20 includes a carrier 22, a first contact 24 integral with the carrier 22, and a second contact 26 integral with the carrier 22. The contact assembly 20 is preferably stamped from a metal sheet such as nickel. Score lines 28 are provided between the carrier 22 and the first and second contacts 24, 26, respectively. The contacts 24, 26 are selectively plated with, for example, gold to define a selectively plated surface 30 and an exposed weldable surface 32 on each contact 24, 26. The selectively plated surfaces are plated in a conventional manner.

The size of the contacts 24, 26 and the area of selective plating are determined relative to the diameter of the cells used in the battery pack and the terminal pitch of the mating connector in the phone. The contact which represents the positive terminal pole must allow enough non-plated surface for welding to the smaller '+' cap. In addition, the overall contact size must be designed such that it does not come in contact with the adjacent cell negative end, since there is no insulator to prevent short circuit. The contact which represents the negative terminal pole must also allow enough non-plated surface for welding, while positioning the selectively plated surface properly with respect to the positive contact. The result is that the positive and negative contacts selective plated surfaces are separated by a distance equal to the mating battery connector terminal pitch (or spacing) in the phone.

During assembly, the carrier 22 is used to support the contacts 24, 26 in the vicinity of the terminal poles 14, 16, and the exposed weldable surfaces 32 of the contacts 24, 26 are welded to respective terminal poles 14, 16. The carrier 22 is then fatigued along the score lines 28 and removed from the assembly. The resulting contacts are securely welded to the terminal poles 14, 16 and provide a gold-plated surface for contact with the leads of the battery pack powered device.

Figure 5A:
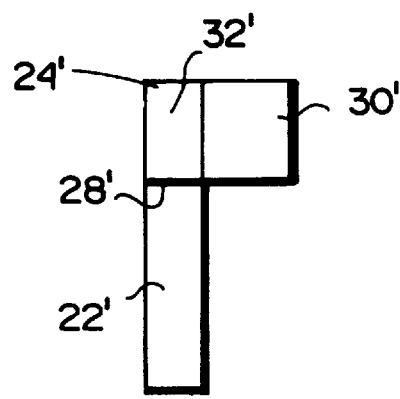
FIG. 5A illustrates an alternative arrangement of the contact assembly.
Figure 5B:
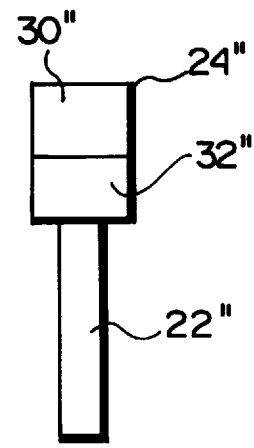
FIG. 5B illustrates another alternative arrangement of the contact assembly.

FIGS. 5A and 5B illustrate alternative embodiments of the contact assembly according to the present invention. In FIG. 5A, the carrier 22' and a single contact 24' integral therewith are substantially L-shaped, wherein the carrier 22' forms a first leg of the L-shape, and the contact 24' forms a second leg of the L-shape. The contact 24' similarly includes an exposed weldable surface 32' and a selectively plated surface 30'. The selectively plated surface 30' is disposed at a distal end of the second leg and is oriented substantially parallel with the first leg. A score line 28' is provided between the carrier 22' and the contact 24'.

In FIG. 5B, the carrier 22" and the contact 24" are substantially T-shaped, wherein the carrier 22" forms a base of the T-shape and the contact 24" forms a cross member of the T-shape. The contact 24" similarly includes an exposed weldable surface 32" and a selectively plated surface 30". In this embodiment, the selectively plated surface 30" is disposed substantially perpendicular to the base across an outermost section of the T-shape cross member.

Figure 1:
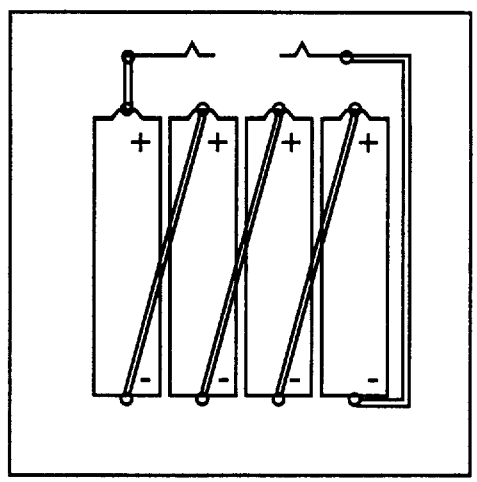
FIG. 1 illustrates a battery pack having a conventional structure.
Figure 2:
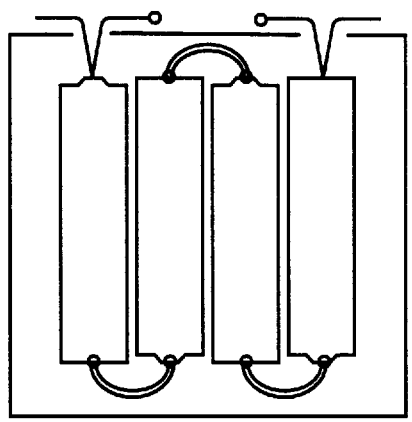
FIG. 2 illustrates an alternative conventional battery pack arrangement.

As still another alternative (not shown), the cell alignment of FIG. 2 may be used with the battery pack contact assembly according to the invention. In this arrangement, the contact assembly 20 would be shaped similar to that illustrated in FIG. 4, however, the carrier 22 would be longer to position the contacts 24, 26 adjacent the outermost cells corresponding to the positive and negative terminal poles.

Figure 6:
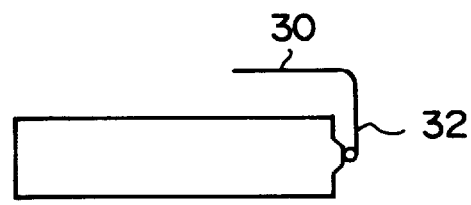
FIG. 6 illustrates still another alternative of the contact assembly.

In order to provide access from an alternate surface of the battery pack, the exposed weldable surface 32 and the selectively plated surface 30 may be bent at substantially a 90° angle as shown in FIG. 6.

By virtue of the structure according to the present invention, a battery pack for a mobile communications device or the like can be made smaller while ensuring a good electrical contact with the device. The use of the battery pack, contact assembly eliminates inventory control and article manipulation problems. Moreover, manufacturing of the battery packs is made easier as the cells in the battery packs can be manufactured in a single assembly line.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A battery pack contact assembly comprising:

a carrier formed of a conducting weldable material; and a first contact integral with said carrier, said first contact having an exposed weldable surface and a selectively plated surface, wherein said carrier is selectively detachable from said first contact.

2. An assembly according to claim 1, comprising a second contact integral with said carrier, said second contact having an exposed weldable surface and a selectively plated surface, wherein said carrier is selectively detachable from said second contact.

3. An assembly according to claim 2, further comprising score lines between said carrier and said first and second contacts, respectively.

4. An assembly according to claim 2, wherein said conducting weldable material comprises nickel.

5. An assembly according to claim 4, wherein said selectively plated surfaces are plated with gold.

6. An assembly according to claim 2, wherein said carrier is substantially U-shaped, and wherein said first and second contacts extend from ends of the U-shape.

7. An assembly according to claim 6, wherein said first and second contacts extend toward each other from the ends of the U-shape, and wherein said selectively plated surfaces are disposed at innermost ends of said first and second contacts.

8. An assembly according to claim 1, wherein said carrier and said contact are substantially L-shaped, said carrier forming a first leg of the L-shape and said contact forming a second leg of the L-shape.

9. An assembly according to claim 8, wherein said selectively plated surface is disposed substantially parallel with said first leg at a distal end of said second leg.

10. An assembly according to claim 1, wherein said carrier and said contact are substantially T-shaped, said carrier forming a base of the T-shape and said contact forming a cross member of the T-shape.

11. An assembly according to claim 10, wherein said selectively plated surface is disposed substantially perpendicular to said base across an outermost section of the cross member.

12. An assembly according to claim 1, wherein said exposed weldable surface and said selectively plated surface are bent at substantially a 90° angle.

13. An assembly according to claim 1, wherein said exposed weldable surface is adapted to be welded to a contact pole of a battery cell, and wherein said selectively plated surface is adapted to contact leads of a device powered by the battery pack.

14. A battery pack comprising:

a plurality of battery cells disposed adjacent one another and connected in series, said plurality of battery cells including a positive terminal pole and a negative terminal pole adapted to contact leads of a device powered by the battery pack; and a positive contact and a negative contact each having an exposed weldable surface and a selectively plated surface, said exposed weldable surfaces being welded to said positive terminal pole and said negative terminal pole, respectively, and said selectively plated surfaces being adapted to contact leads of a device powered by the battery pack.

15. A battery pack according to claim 14, wherein said positive contact and said negative contact are formed of nickel, said selectively plated surfaces being plated with gold.

16. A battery pack according to claim 14, comprising N battery cells where N is at least 4, wherein said battery cells are aligned in a pattern such that a negative pole of one battery cell is disposed adjacent and electrically connected to a positive pole of an adjacent battery cell, one of the positive pole and the negative pole of the (N−1)th cell comprising the corresponding one of said positive terminal pole and said negative terminal pole, and the other of the positive pole and the negative pole of the Nth cell comprising the corresponding other of said positive terminal pole and said negative terminal pole, wherein one of the negative pole and the positive pole of said Nth cell is electrically connected to one of the positive pole and the negative pole of the first battery cell, respectively.

17. A method of manufacturing a battery pack including a plurality of battery cells disposed adjacent one another and connected in series, the plurality of battery cells including a positive terminal pole and a negative terminal pole adapted to contact leads of a device powered by the battery pack, and a positive contact and a negative contact, the method comprising:

(a) stamping a battery pack contact assembly from a metal sheet, the battery pack contact assembly including the positive contact and the negative contact integral with a carrier;

(b) selectively plating the positive contact and the negative contact to define a selectively plated surface and an exposed weldable surface;

(c) welding the exposed weldable surfaces of the positive contact and the negative contact to the positive terminal pole and the negative terminal pole, respectively; and (d) separating the carrier from the contacts.

18. A method according to claim 17, wherein step (a) comprises forming a score line between the carrier and the contacts.

19. A method according to claim 18, wherein step (d) is practiced by fatiguing the carrier along the score line.

20. A method according to claim 17, wherein step (b) is practiced by selectively plating with gold.

\* \* \* \* \*